United States Patent [19]

Hoshino et al.

[11] 3,716,594

[45] Feb. 13, 1973

[54] PROCESS FOR THE PRODUCTION OF LIVING OLIGOMER

[75] Inventors: Yutaka Hoshino; Koshiro Matsukawa; Akira Nadaka; Kazuo Uno, all of Niigata, Japan

[73] Assignee: Nippon Soda Co., Ltd., Tokyo, Japan

[22] Filed: March 25, 1970

[21] Appl. No.: 22,489

[30] Foreign Application Priority Data

April 1, 1969    Japan.................................44/24412

[52] U.S. Cl......260/665 R, 260/465.8 R, 260/485 R, 260/612 R, 260/683.15 D, 260/668 R
[51] Int. Cl................................................C07f 1/04
[58] Field of Search.....................................260/665 R

[56] References Cited

UNITED STATES PATENTS

| | | | |
|---|---|---|---|
| 2,816,913 | 12/1957 | Frank et al | 260/665 R |
| 2,816,916 | 12/1957 | Frank et al | 260/665 R |
| 2,816,935 | 12/1957 | Watson et al | 260/665 R |
| 2,865,969 | 12/1958 | Schott | 260/665 |
| 3,055,952 | 9/1962 | Goldberg | 260/665 R |
| 3,222,394 | 12/1965 | Rowland et al | 260/665 |

*Primary Examiner*—James E. Poer
*Assistant Examiner*—A. P. Demers
*Attorney*—George B. Oujevolk

[57] ABSTRACT

In the process for producing alkali metal dianion complex dimer (disodiooctadiene) and metal dianion complex oligomer which is an initiator for living polymerization by reaction between fine particles of sodium metal and 1, 3-butadiene, cohesion of sodium metal particle is avoidable by maintaining the ratio of ME/LE of 2.0 to 0 wherein ME is the molar quantity of metallic sodium (unreacted sodium metal); LE is the equivalent quantity of carbanion complex terminal of disodiooctadiene (sodium corresponding to cation attached to butadiene) and the resulting initiator gives living polymer having narrow polymerization degree and a coincident average polymerization degree with the expected value calculated from the molar ratio of the sodium metal to butadiene.

4 Claims, 8 Drawing Figures

Yutaka Hoshino
Koshiro Matsukawa
Akira Nakada
Kazuo Uno

INVENTORS

Yutaka Hoshino
Koshiro Matsukawa
Akira Nakada
Kazuo Uno

INVENTORS

BY
ATTORNEY

PROCESS FOR THE PRODUCTION OF LIVING OLIGOMER

DETAILED EXPLANATION OF THE INVENTION

This invention relates to the improved process for the preparation of living polymer and more particularly is concerned with the improved process for the preparation of living oligomer by reaction of dispersed metallic alkali with the monomer in the presence of a Lewis base compound.

Living polymerization which comprises polymerizing styrene or a conjugated diolefin such as butadiene or isoprene in the presence of a polymerization initiator consisting or a Lewis base compound having no active hydrogen atoms and dispersed metallic alkali a or complex compound thereof having active carbanions, which is derived from the reaction between the monomer and/or specified aromatic compounds and the metallic alkali, is well known. Since the living polymer keeps its terminal active carbanions on both ends of the polymeric chain after consuming all of the monomer in the reaction system, when the monomer is further added, chain propagation takes place and when an electrophilic reagent such as alkylene oxide, carbon dioxide or ethylene sulfide, is mixed in, the introduction of functional groups to the polymeric chain can be attained. Further, it is also well known that the polymer is theoretically characterized by having a narrow molecular weight distribution, an average molecular weight in substantial coincidence with the theoretical value calculated from a molar ratio of the metallic alkali to the monomer and an expected content of the functional group in case of treating with the electrophilic reagent.

Living polymerization initiated by metallic alkali is considered to consist of the following elemental reactions:

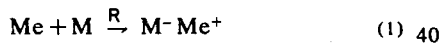

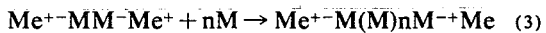

Wherein Me represents the metallic alkali, M represents the monomer and R represents an activator.

That is to say, dispersed metallic alkali gives an electron to the monomer, via the activator as a medium if present (in the elemental reaction (1) ), two radical anion intermediates couple together and form an alkali metal-dianion complex dimer (in the elemental reaction (2) ) and chain propagation takes place if further monomer exists (in the elemental reaction (3) ).

When the reaction is conducted on a relatively small scale under appropriate conditions and the monomer is introduced at a moderate rate, all of the dispersed metallic alkali in the reaction system is converted to alkali metal-carbanion complex dimer through the elemental reaction (1) and (2), and if the monomer is further added, chain propagation takes place without giving rise to a chain transfer reaction and then a living polymer having a good coincident average molecular weight with the desired properties is obtained.

However, when the above reaction is performed on a large scale, all of the dispersed metallic alkali introduced into the reaction system cannot always be converted to the complex, and a part of it coheres together without participation with the reaction. There are serious defects in this case because the resulting polymer shows an extremely high value of an average molecular weight which has deviated from the expected value calculated from a molar ratio of the metallic alkali to the monomer and cohered metallic alkali sometimes causes blockages in a delivery pipe of the reactor and forces suspension of operations. Furthermore even if a relatively small particle of cohered metallic alkali can be converted to the complex, there is a long delay in the reaction and there is a broad distribution of molecular weight in the resulting polymer.

Thus, one of the objects of the present invention is to provide a method for converting the metallic alkali to an alkali metal-carbanion complex oligomer (in the specification and claims, the term oligomer includes dimer) with a substantially high theoretical yield. Another object of the invention is to provide a living oligomer having an extremely narrow distribution of polymerization degree and a good coincident polymerization degree with a theoretical value calculated from the molar ratio of the charged metalic alkali to the monomer. A further object of the invention is to provide a polymerization initiator suitable for producing a polymer having the aforesaid characteristic. A still further object of the invention is to provide an appropriate apparatus for performing the aforementioned method. Other objects will become apparent from the following detailed description and accompanying drawings.

DETAILED DESCRIPTION

Figure 1A:
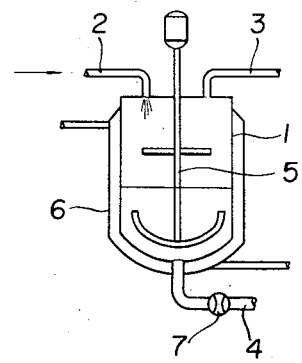
FIG. 1-A to FIG. 1-D are sectional views of a reaction vessel for a batch process.
Figure 1B:
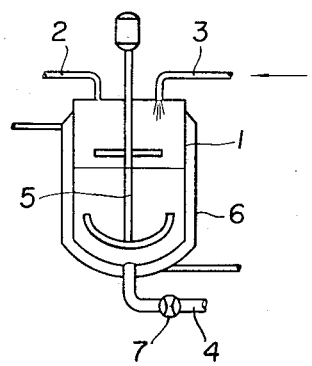
Figure 1C:
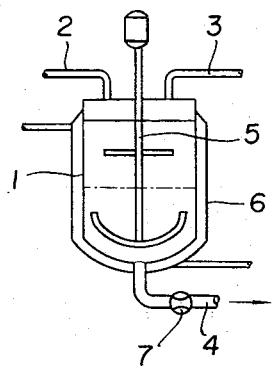
Figure 1D:
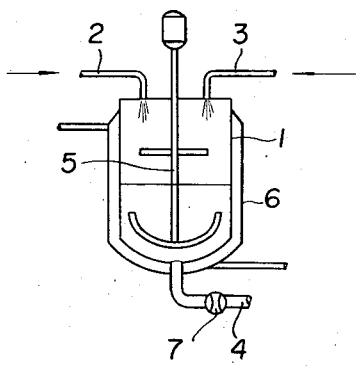

The inventors carried out an intensive investigation in order to solve the problem of producing a living oligomer, and discovered that cohesion of the dispersed metallic alkali appeared at the beginning of the reaction in a batch operation, and after the alkali metal-carbanion complex dimer was accumulated in the reaction mixture up to a certain extent, in other words, after about 30 percent of the dispersed metallic alkali was charged and converted to the complex dimer, cohesion of the metallic sodium was not observed. By further investigation, the inventors finally found that if a certain amount of the complex dimer prepared by any method is present in the starting mixture in advance, cohesion of the metallic sodium can be avoided.

Consequently the process of the present invention is carried out in such a manner that the dispersed metallic alkali was made to react with the conjugated diolefin monomer which may contain styrene or methyl styrene, in the presence of a Lewis base compound, and in the presence of an activator if desired, with cooling and sufficient agitation, maintaining the condition in which a ratio of [Me]/[LE], in the reaction mixture is never over 2, wherein [Me] expresses the molar quantity of metallic alkali and [LE] expresses the equivalent quantity of carbanion complex terminal (in the complex dimer, [LE] is twice as its molar quantity). However, [Me] does not include any cohered metallic alkali which becomes inactive and does not participate the reaction.

Lithium, sodium, potassium, rubidium, cesium, and their alloys with other metallic alkali or metallic alkali earth, and mixtures thereof are included as the metallic alkali in this invention. They are employed in a form of small particles of which the maximum diameter is less than $50\mu$ and less than $20\mu$ in the average, and dispersed into an inert hydrocarbon medium.

The activator which can be used in this invention includes condensed ring aromatic hydrocarbons such as anthracene, naphthalene and phenanthrene; polynuclear aromatic hydrocarbons consisting of non-condensed rings such as biphenyl and terphenyls; polynuclear aromatic hydrocarbons consisting of condensed rings such as binaphthyls and phenyl-naphthalenes; conjugated unsaturated hetero-cyclic compound having a vinyl group on a side chain such as 4-vinyl pyridine and 2-vinyl furan; and diaryl ketones such as benzophenone and phenyl naphthyl ketone.

The amount of the activator to be used is preferably in the range of 0.001 mole to 1 mole based on 1 mole of the metallic alkali. But when the metallic alkali is finely divided into small particles such as less than $5\mu$, the reaction takes place smoothly even without addition of the activator.

The Lewis base compounds which can be used in this include ethers, acetals, and amines having no active hydrogen atoms. Typical examples suitable for the process of the invention are aliphatic monoethers such as dimethyl ether and methyl ethyl ether; aliphatic polyethers such as 1,2-dimethoxy ethane and 2,2'-dimethoxy diethyl ether; cyclo ethers such as tetrahydrofuran and 1,4-dioxane; acetals such as methylal and 1,1-dimethoxy ethane; and tertiary amines such as trimethyl amine, triethyl amine and N-methylmorpholine. The amount of the Lewis base compound is at least three parts in weight per one part of the metallic alkali, and preferablly 10 to 200 parts which is decided by taking into account the fluidity and heat conductivity.

The monomer which can be used in this invention includes conjugated diolefins such as butadiene and isoprene; vinyl monomer such as styrene and $\alpha$-methyl styrene; solutions or mixtures containing the above monomer such as the fraction which can be obtained from the $C_4$ fraction of cracking gas; and mixture thereof.

A typical example of the composition of BB fraction is presented in Table 1.

TABLE 1.

| Constituent | | |
|---|---|---|
| Propane | 0–1 | mole percent |
| Propylene | 0–5 | - do - |
| n-Butane | 1–50 | - do - |
| Iso-butane | 1–20 | - do - |
| Butene-1 | 10–60 | - do - |
| Trans-butene-2 | 1–20 | - do - |
| Cis-butene-2 | 1–20 | - do - |
| Iso-butylene | 1–50 | - do - |
| 1,3-Butadiene | 10–60 | - do - |
| 1,2-Butadiene | 0.02–0.2 | -do- |
| $C_5$-hydrocarbons | 0–0.2 | -do- |
| Acetylene | 0–0.2 | - do - |
| Sulphur | 1–15 | p.p.m. |

The feeding rate of the monomer is favorably controlled to maintain less than 10 mole/hr/liter of the reactor space and the quantity of the monomer to be charged is decided taking into account the final product. For example, when the polymerization initiator is aimed at, around equal molar ratio, based on mole of the dispersed alkali, the monomer is employed and when the higher polymer is wanted, further excess amounts of monomer must be added. The temperature of the reaction mixture is maintained in the range between $-20°$ and $-80°C$ and preferably between $-40°$ and $-80°C$. The reaction being carried out at high temperature, stems from the polymer having a broad distribution of molecular weight.

One of the embodiments in which the process of the present invention is performed in a batch operation is explained in FIG. 1. In FIG. 1-A, a solution containing the complex oligomer having metallic alkali-carbanion complex terminals is placed in the reaction vessel 1 provided with a metallic alkali dispersion inlet 2, a monomer inlet 3, a reactant outlet 4, an agitation means 5 and a cooling jacket 6. Under inert atmosphere and a cooling by circulating cooling medium such as trifluoromonochloromethane into the jacket, metallic alkali dispersion dispersed into the Lewis base compound which may contain an initiator and other inert diluents such as aliphatic hydrocarbons is introduced into the vessel through the metallic alkali dispersion inlet 2 keeping the value of [Me]/[LE] in the reaction system within the range of 0 to 2 and preferably 0 to 1.5, and a certain amount of the monomer or the monomer solution is introduced gradually through the monomer inlet 3 (in FIG. 1-B) followed by digestion for a while in order to complete the reaction. Thus, a solution of alkali metal-carbanion complex dimer or polymer which is settled, depending on the quantity of charged monomer against metallic alkali, is formed and can be taken out by opening the valve 7 through the reactant outlet 4 (in FIG. 1-C). A part of the reactant should be retained in the reaction vessel (represented by a dot line) and used for the next reaction.

In the other modified example, the metallic alkali dispersion and the monomer or the solutions thereof are introduced into the reaction vessel alternatively or simultaneously under cooling, agitation and inert atmosphere (in FIG. 1-D), and since the complex compound is successively generated in accordance with the addition in this method, a relatively small amount of the reactant to be retained in the vessel in the former reaction is necessary compared with the above method.

The quantity, in moles, of the monomer to be charged is equal to or more than the metallic alkali and when the quantity of the monomer is about equal to metallic alkali, the complex dimer is obtained and when the quantity of the monomer is in excess, the complex polymer is obtained. However, in case of producing a higher polymer, the monomer is preferably polymerized in the other apparatus using a complex dimer aforesaid as a polymerization initiator in the viewpoint of an apparatus efficiency.

Two of the embodiments in which the process of the present invention are performed in a continuous process are explained in FIGS. 2,3,4 and 5.

Figure 2:
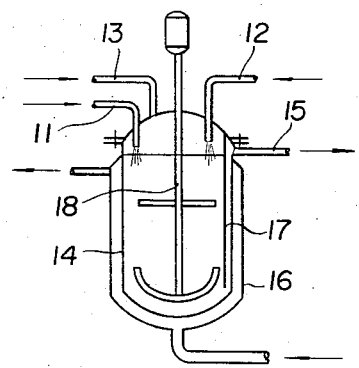
FIG. 2 is a sectional view of a reaction vessel for a continuous process.

In FIG. 2, a solution containing the complex oligomer prepared by the former reaction or by any other convenient means is placed in a reaction vessel 14 equipped with a metallic alkali dispersion inlet 11, a monomer inlet 12, an inert gas inlet 13, a reactant outlet 15, an agitation means 18, and a cooling jacket 16. Under inert atmosphere and cooling by circulation a cooling medium into the jacket, the metallic alkali dispersion having a similar composition to that described in FIG. 1 and the monomer or the solution thereof are introduced gradually into the reaction vessel through each inlet and the complex compound is taken out continuously through a laminer flow zone composed of the screen plate 17 and the wall of the reactor and from the reactant outlet 15 by overflow. During the operation, feeding rates of the metallic alkali and the monomer should be controlled so as to maintain the value of [Me]/[LE] within the range between 0 and 2.

Figure 3:
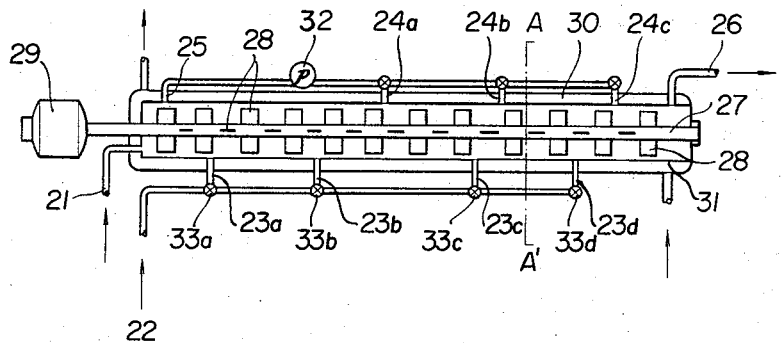
FIG. 3 is a longitudinal sectional view of one form of the reactor in a continuous process.
Figure 4:
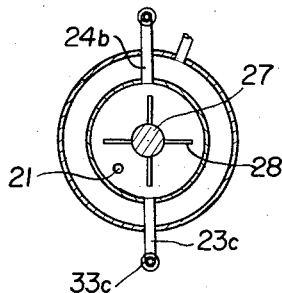
FIG. 4 is a cross sectional view of the reactor taken on line A—A' of FIG. 3.

In FIG. 3, a cylindrical reactor provided with a metallic alkali dispersion inlet 21 in one end of a cylinder, a single or plural number of monomer inlets 23a 23b ... 23n, a reactant circulation system 32,24a, 24b ... 24n, 25 in which a part of the reactant containing complex compound is taken out from the outlets 24a, 24b ... 24n and recycled to a reactant inlet 25, through a circulating pump 32 and a cooling jacket 30, and having a shaft 27 equipped with plural lines of agitation blades 28 and driven by a motor 29 inside of the cylinder, is filled with the complex compound prepared by any convenient means. Under a cooling by circulating cooling medium into the jacket 30 and by rotating the shaft 27, the metallic alkali dispersion having a similar composition as described in FIG. 1 is fed through the inlet 21 gradually and a controlled quantity of the monomer or solution thereof is distributed to the monomer inlets adjusted by control valves 33a, 33b ... 33n and introduced into the reactor. Although only one of the metallic alkali dispersion inlet was illustrated, a plural number of inlets can be furnished and in such case the monomer inlets and the dispersion inlets are generally placed alternately.

Figure 5:
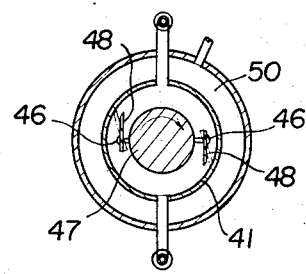
FIG. 5 is a cross sectional view of another type of the reactor.

The feeding rates of the monomer and the metallic alkali dispersion should be controlled so as to keep the ratio of [Me]/[LE] within the range defined as aforementioned and taking into account the heat transfer efficiency. The number of the monomer inlets can be chosen as desired, but their positions on the reactor should all be upstream in the flow direction from the recycled reactant inlet 25. Generally speaking, since the introducing of a large amount of monomer in a certain zone at one time results in the proceeding of the chain propagation reaction in parallel with the generation of the complex compound, and results in the broad molecular weight distribution of the product, providing a plural number of the monomer inlets is preferable. The length and diameter of the reactor is decided by taking into consideration the heat transfer area, capacity, etc. and the length must be such that unreacted metallic sodium cannot be detected around the discharge pipe 26. However, a further excess zone of the reactor can be made use of as a polymerization zone or a chain propagation zone by furnishing further monomer inlets. The shape of the agitation blade 28 is not limited to the one presented in FIGS. 3 and 4, and a modified blade arrangement is shown in FIG. 5 in which the blades 48 are loosely fixed on a shaft 47 by pins 46 and the edge of the blade is scraping the inside wall of the reactor by rotating the shaft in direction of the arrow.

If the feeding rate of the monomer is appropriately chosen the initiating reaction (the elemental reactions (1) and (2) ) preferentially proceeds until all of the metallic alkali in the reaction mixture is converted to the complex dimer and then the chain propagation (the elemental reaction (3) ) takes place. However, in the commercial equipment, the chain propagation sometimes proceeds together with the initiating reaction and the resulting polymer tends to have a broad molecular weight distribution. Therefore, in order to prevent the proceeding of the chain propagation, it is preferable that the monomer be added gradually until the molar ratio of the monomer to the metallic alkali reaches 10 in case of the batch operation, and the molar quantity of the monomer introduced to the reactor should be nearly equal to that of the metallic alkali, or the monomer should be charged through a plural number of the inlets in case of the continuous operation.

The inventors conducted a further detailed investigation of the reaction for the purpose of finding an appropriate method for preventing the chain propagation arising together with the initiation reaction and found that, in the batch operation exemplified in FIG. 1, the chain propagation is inclined to proceed easily in proportion to the decreasing of the unreacted metallic alkali content, and that particularly when the value of [Me]/[LE] went down below 0.25, it was necessary to add the monomer very carefully and slowly. Consequently, the inventors came to the conclusion that the reaction can be preferably performed at the range of between 2.0 and 0.25 of [Me]/[LE] value and then the complex compound should be taken out by separating the unconverted metallic alkali from the reactant.

With regard to the method shown in FIGS. 1-A to 1-C, feeding of the monomer is preferably stopped before the value of [Me]/[LE] reaches 0.25 and the unreacted metalic alkali is separated from the complex compound by any convenient means, such as filtration or decantation. With respect to the method in FIGS. 1-D and 2, a certain amount of the metallic alkali is always made to exist in the reaction system by controlling the feeding rate of the metallic alkali dispersion and the monomer. Furthermore, concerning the method in FIG. 3, the metallic alkali is preferably charged a little in excess of the monomer. Because the complex compound solution prepared according to this method possibly includes the metallic alkali particles, they may be eliminated by any common means such as filtration or centrifugal separation for the sake of obtaining a complex compound having an uniform polymerization degree, which is suitable for preparing the living polymer having an extremely narrow distribution of molecular weight.

The complex compound prepared by the process of the invention may be employed as an initiator for living polymerization and a polymer having or not having functional groups on its terminals can be obtained by the addition of the, monomer such as conjugated diolefins, styrenes, methacrylates, acrylates, and acrylonitrile to the complex compound and successively being treated with water, alcohols, acid or electrophilic reagent such as carbon dioxide, alkylene oxides, carbon disulfide and alkylene sulfides. On the other hand, if the complex compound is directly mixed with water, alcohol, acids or the electrophilic reagent, important useful chemical intermediates such as octadiene, dodecadienediol and octadiene dicarboxylic acid, which varies depending on its polymerization degree and kind of the reagent for termination, can be obtained in good yield.

According to the process of the present invention, all of the metallic alkali charged is converted to the complex oligomer without cohesion even in the large scale commercial plant so that the resulting polymer derived from the complex compound has a good coincident average molecular weight with an expected value calculated from the molar ratio of the metallic alkali to the monomer. Accordingly, the polymerization degree of the product is easily controllable and there is no difficulty caused by line blockage by cohered metallic alkali. Further, when the reaction is so conducted that at least the specified amount of fine particles of the metallic alkali are always present in the reaction system, preventing the parallel progress of the initiation reaction and the chain propagation results in the polymer characterized by an extremely narrow distribution of the polymerization degree. Moreover, by recycling the complex compound solution, the early stage of the reaction is always conducted with plenty of liquid, the reaction heat generated is removed immediately and completely, and an unfavorable side reaction caused by the local elevation of the temperature can be avoided.

Example 1

In a 50 liter reaction vessel, similar to one shown in FIG. 1, having an anchor type agitator in it and equipped with a thermometer, a monomer inlet, an inert gas inlet and a cooling jacket was prepared for the reaction. 18 parts of tetrahydrofuran, and 0.345 part of 1,2-diphenyl benzene were placed in the reaction vessel after replacing the atmosphere by nitrogen gas and 1.728 parts of 40 percent metalic sodium fine particles dispersed in kerosene having 6$\mu$ of an average particle size was added under agitation. Cooling the mixture at −78°C by adding dry ice and methanol in the cooling jacket, 1.296 parts of butadiene was gradually added for 4 hours and the resulting mixture was filtered through a porous plate consisting of sintered stainless steel and having about 40$\mu$ of holes, and 9 parts of the filtrate was returned to the reaction vessel. Another small quantity of the filtrate was mixed with carbon dioxide in another vessel, hydrolysed, acidified by the addition of dilute hydrochloric acid and then the octadiene dicarboxylic acid was obtained. According to the neutralization diagram of the hydrolysed solution, an equivalent ratio of unreacted metallic sodium [Me] to alkali metal-carbanion complex terminal [LE],([Me]/[LE]) (hereinafter this ratio is represented as R), was estimated as 0.217. About 0.018 part of cohered metallic sodium was left on the filter.

90 parts of the filtrate which was estimated to be composed of 7.59 parts of tetrahydrofuran, 0.051 part of unreacted sodium, 0.144 part of 1,2-diphenyl benzene, 0.547 part of sodium-carbanion complex dimer of butadiene, 0.233 part of sodium which composed the complex with carbanion, 0.435 part of kerosene was returned to the reaction vessel and 9 parts of tetrahydrofuran and 0.75 part of 40 percent sodium dispersion were further added to it. At that time R value was estimated as 1.505. Then, 0.549 part of pure butadiene was gradually added to the mixture for 30 minutes under chilling at −78°C. The resulting reaction mixture (hereinafter named as Mixture [I]) showed 0.253 of R value according to the similar analytical procedure aforementioned. During this operation, the cohesion of metallic sodium was not observed and sodium lumps could not be detected on the filter.

By means of a centrifugal separation, Mixture I was divided into two layers; i.e., 9.59 parts of Mixture I-a which substantially did not contain the metallic sodium and was estimated to be composed of 8.3 parts of tetrahydrofuran, 0.072 part of diphenyl benzene, 0.548 part of sodium-carbanion complex dimer of butadiene, 0.233 part of sodium which composed the complex with carbanion and 0.433 part of kerosene, and 9.71 parts of Mixture I-b which contained unreacted metallic sodium and was estimated to be composed of 8.29 parts of tetrahydrofuran, 0.072 part of diphenyl benzene, 0.548 part of sodium-carbanion complex dimer of butadiene, 0.233 part of sodium which composed the complex with carbanion, 0.118 part of metallic sodium and 0.442 part of kerosene. R value of Mixture I-b was determined as 0.507 by the analysis. Mixture I-b was returned again to the reaction vessel, a similar reaction was repeated by adding 8.3 parts of tetrahydrofuran and 0.582 part of 40 percent sodium dispersion (R value of the resulting mixture became 1.505), and successively followed by gradual addition of 0.548 part of butadiene for 30 minutes under chilling at −78°C, and thus Mixture II which had similar composition as Mixture I and 0.253 of R value was obtained. In spite of decreasing the content of diphenyl benzene (activator) in comparison with Mixture I, the operation ran smoothly.

The reaction was repeated several times in a similar manner, but only when the R value was maintained within the range between 1.5 and 0.25, cohesion of metallic sodium particle could not be observed.

To a part of Mixture I-a, an excess amount of ethylene oxide was added, and the resulting mixture was hydrolysed, neutralized with hydrochloric acid and left standing for separation. The upper clear layer was filtered and evaporated, and then a yellow clear liquid having 550 of hydroxyl value was provided. An average molecular weight determined by vapor pressure osmometer with benzene solution of acetylated product was 290 and the analytical data indicated that the complex compound in Mixture I-a consisted substantially of complex dimer of butadiene.

9.59 parts of Mixture I-a was placed in another reaction vessel and 10 parts of butadiene-tetrahydrofuran solution (1:1) was gradually added during 2 hours under chilling at −78°C in an inert atmosphere and the reactant was hydrolysed, separated from a water layer, treated with diatomaceous earth and dried successively and then 5.54 parts of the liquid butadiene polymer was provided. The yield was theoretical. The observed number of average molecular weight ($\overline{Mn}$) determined by a vapor pressure osmometer was 1090 which was well coincident with the expected value of 1100.

Further, the polymer was absorbed on the absorbant (which can be obtained under the trade name of Celit 545 from Johns-Manville Sales Corp.), the absorbant was eluted out into 40 fractions by mixed solvents of methanol and benzene with several different ratios and then the average molecular weight of each fraction was determined by the vapor pressure osmometer. The weight average molecular weight ($\bar{M}w$) calculated from the results of the elution chromatography was 1370 and ($\bar{M}w/\bar{M}n$) value which represented a degree of molecular weight distribution was as low as 1.24 (ideal distribution is represented by 1.0). Taking into account the low polymerization degree, this value can be regarded as fairly good.

By contrast, when Mixture I was handled in a similar manner as mentioned above without separation of unreacted metallic sodium, the polymer having 1130 of a number average molecular weight, 1600 of a weight average molecular weight and 1.42 of ($\bar{M}w/\bar{M}n$) value was obtained.

Example 2

A 70 liter reaction vessel which resembles the one represented in FIG. 2, provided with an agitator, cooling coil and a cooling jacket, 37.49 kg of the complex dimer solution which had been prepared by another reaction and contained 26.4 g of sodium-carbanion complex dimer of butadiene and 4.8 g of metallic sodium fine particle in 1 kg of the complex solution were placed. Continuous production of the complex dimer was conducted in such a manner that the metallic sodium dispersion chilled at −74°C and consisted of 1.6 parts of metallic sodium fine particles, 2.4 parts of kerosene, and, 70 parts of tetrahydrofuran was fed to the reactor at the rate of 88 kg/hr through the dispersion inlet, 42 percent diluted butadiene solution in tetrahydrofuran chilled at −74°C was fed at the rate of 8.1 kg/hr, keeping the temperature at −62°C by passing a cooling medium through the coil and jacket and the reaction mixture was discharged continuously from the reactant outlet through a laminer flow zone composed of a screen plate and the wall of the reaction vessel. The discharged reaction mixture was fed to a centrifugal separator and divided into two layers: Mixture III-*a* which did not include unreacted metallic sodium and Mixture III-*b* including unreacted metallic sodium, which was recycled to the reaction vessel. The amount of sodium-carbanion complex terminal and unreacted dispersed metallic sodium in the discharged reaction mixture before centrifugal separation was determined by the same method as described in Example 1 and feeding rates of the metallic sodium dispersion and the monomer solution were controlled so as to maintain 0.43 of R value in the discharged reaction mixture. A 40 mesh strainer was equipped on the pipe between the reactant outlet and the centrifugal separator in order to be sure of complete prevention of sodium cohesion, but no lumps of metallic sodium could be observed. After adding solid carbon dioxide to a part of Mixture III-*a*, followed by slight acidification by diluted hydrochloric acid, separating water layer, and distilling off the solvent, the product having 547 of neutralization value was obtained. The product was hydrogenated in the presence of a nickel catalyst, esterified by dimethyl sulfate, and the result of gas chromatography analysis on the methyl ester indicated that the product consisted of dicarboxylic acid having ten carbon atoms.

A 1 liter flask, 300 g of Mixture III-*a* was placed and 100 g of butadiene was added gradually for 1 hr under chilling at −78°C and agitation, and the reaction mixture was treated in a manner similar to the polymer solution described in Example 1. According to the analytical data of the polymer obtained above, the butadiene polymer had 1100 of a number average molecular weight (expected value was 1125), 1350 of a weight average molecular weight and 1.23 of ($\bar{M}w/\bar{M}n$) value.

Example 3

Two reaction vessels being similar to the reaction vessel described in Example 2 were joined in series and 37.5 kg of the complex dimer solution having 0.43 of R value, which was prepared by another reaction and contained 26.4 g of the sodium carbanion complex dimer of butadiene and 4.8 g of metallic sodium fine particles in 1 kg of the complex solution was placed in the first reaction vessel. Under agitating and chilling at −70°C by means of circulating a cooling medium into the coil and the jacket, the metallic sodium dispersion consisting of 70 parts of tetrahydrofuran, 1.2 parts of metallic sodium fine particles and 1.8 parts of kerosene was fed at the rate of 88 kg/hr through the dispersion inlet, and 42 percent tetrahydrofuran solution of butadiene chilled at −74°C was fed at the rate of 4 kg/hr. Maintaining the reactant volume in the first reaction vessel at 50 liters, the over-flowed reaction mixture was discharged continuously from the reactant outlet and introduced to the second reaction vessel through the dispersion inlet, in which a similar tetrahydrofuran solution of butadiene as mentioned above was added at the rate of 4.2 kg/hr after the vessel was filled with 50 liters of the reaction mixture.

The reaction mixture discharged from the second reaction vessel was continuously fed to the centrifugal separator and divided into two layers — Mixture IV-*a* which did not include unreacted metallic sodium and Mixture IV-*b* including unreacted metallic sodium particles which was recycled to the first reaction vessel. The composition of Mixture IV-*a* was as follows: tetrahydrofuran 92.6 percent, sodium carbanion complex dimer of butadiene 3.58 percent, sodium composed the complex dimer with carbanion 1.504 percent and kerosene 2.3 percent. R values of the reaction mixtures discharged from the first and second reaction vessel, which were determined by making use of the difference of reactivity against benzyl chloride, were 1.0 and 0.43 respectively. The operation had been running for 1 week but no cohesion of metallic sodium particle was observed.

200 g of Mixture IV-*a* was placed in a flask and 200 g of 50 percent butadiene solution in tetrahydrofuran was gradually added for 2 hours and then the resulting reaction mixture was dealt with in a procedure similar to that described in Example 2. According to the analytical data of the polymer obtained above, the butadiene polymer had 1,590 of a number average molecular weight which was coincident with an expected value of 1,642.

The operation was also carried out in a similar manner except for employing metallic lithium dispersion in lieu of metallic sodium dispersion and without any trouble on a cohesion of lithium, lithium carbanion complex dimer of butadiene was obtained.

Comparative Example

The reaction was conducted in such a manner that without the preceding charge of the complex dimer solution in the reaction vessel in Example 2, 36.5 kg of tetrahydrofuran which contained 0.6 kg of metallic sodium fine particles and 0.9 kg of kerosene was directly charged and successively 2.4 kg of 42 percent butadiene solution in tetrahydrofuran was added for 30 minutes under vigorous agitation and chilling. After completing the reaction, the reaction mixture was filtered by a stainless steel filter and more than 20 of sodium lumps having 2 –3 mm of diameter and three big sodium lumps having about 20 mm of diameter were collected on the filer. The reaction was repeated until finally big sodium lumps blocked the discharging pipe. After carboxylating a part of the reaction mixture in accordance with the procedure similar to that described in Example 2, dicarboxylic acid compound having 430 of neutralization value which declined against the expected value of 566 and containing liquid polymer which was detected as a residue after distillation of the methylated dicarboxylic acid compound was obtained.

We claim:

1. A process for a production of sodium metal-dianion complex dimer of disodiooctadiene free of cohered sodium metal particles in the end product, which comprises:

feeding into a solution of disodioctadiene having a ratio of ME/LE from 2.0 to 0, in a reaction vessel, 1. sodium particles having an average particle size less than $20\mu$ and having an maximum particle size less than $50\mu$, in the presence of tetrahydrofuran which is present in an amount of 10–200 parts in weight per one part of metallic sodium, and
   2. 1,3-butadiene, said feeding being simultaneously or alternately and under agitation and chilling at $-20°$ to $-80°C$, and maintaining the ratio of ME/LE in said solution between 2.0 and 0.25, wherein ME represents the molar quantity of unreacted metallic sodium, and LE represents the equivalent quantity of carbanion of disodiooctadiene corresponding to reacted metallic sodium.

2. A process according to claim 1 in which said butadiene is fed into said vessel at a rate of less than 10 mole/hr/liter of the reaction vessel capacity.

3. A process according to claim 1 in which an activator selected from the group consisting of anthracene, naphthalene, phenanthrene, biphenyl, terphenyls, binaphthyls, phenylnaphthalenes, 4-vinyl pyridine, 2-vinyl furan, benzophenone and phenyl naphthyl ketone, is also present in said vessel in the range of 0.001 mole to 1 mole based on 1 mole of the metallic sodium is employed.

4. A process according to claim 1, in which the butadiene fed into said vessel is contained in a $C_4$ fraction of cracking gas.

* * * * *